(12) United States Patent
McNab et al.

(10) Patent No.: US 10,495,437 B2
(45) Date of Patent: Dec. 3, 2019

(54) ANGULAR DISPLACEMENT OF FLEXIBLE PIPE

(71) Applicant: GE Oil & Gas UK Limited, Bristol (GB)

(72) Inventors: John McNab, Bristol (GB); Philip Michael Nott, Bristol (GB); Geoffrey Stephen Graham, Bristol (GB); Andrew Wharton, Bristol (GB)

(73) Assignee: GE Oil & Gas UK Limited, Bristol (GB)

( * ) Notice: Subject to any disclaimer, the term of this patent is extended or adjusted under 35 U.S.C. 154(b) by 217 days.

(21) Appl. No.: 15/532,235

(22) PCT Filed: Nov. 30, 2015

(86) PCT No.: PCT/GB2015/053659
§ 371 (c)(1),
(2) Date: Jun. 1, 2017

(87) PCT Pub. No.: WO2016/087836
PCT Pub. Date: Jun. 9, 2016

(65) Prior Publication Data
US 2017/0299369 A1     Oct. 19, 2017

(30) Foreign Application Priority Data

Dec. 2, 2014  (GB) .................................. 1421421.7

(51) Int. Cl.
*G01B 5/30*  (2006.01)
*G01B 5/12*  (2006.01)
(Continued)

(52) U.S. Cl.
CPC ................. *G01B 5/30* (2013.01); *G01B 5/12* (2013.01); *G01B 7/16* (2013.01); *F16L 11/083* (2013.01)

(58) Field of Classification Search
None
See application file for complete search history.

(56) References Cited

U.S. PATENT DOCUMENTS 3,620,074 A   11/1971  Laimins et al.
3,719,913 A    3/1973  Dubose et al.
(Continued)

FOREIGN PATENT DOCUMENTS

CN    101111754 A     1/2008
CN    101571218 A    11/2009
(Continued)

OTHER PUBLICATIONS

International Search Report for International Application No. PCT/GB2015/053659, dated Feb. 25, 2016.
(Continued)

*Primary Examiner* — Clayton E. LaBalle
*Assistant Examiner* — Dennis Hancock
(74) *Attorney, Agent, or Firm* — Knobbe Martens Olson and Bear, LLP

(57) ABSTRACT

A method and apparatus are disclosed for determining a bending radius of a flexible pipe. The apparatus includes at least one bend sensor element comprising an elongate flexible substrate and at least one bend sensitive element on the substrate that has at least one electrical characteristic that is responsive to angular displacement of the substrate. The apparatus also comprises a flexible crush resistant elongate housing that supports and surrounds the bend sensor element.

18 Claims, 9 Drawing Sheets

(51) Int. Cl.
*G01B 7/16* (2006.01)
*F16L 11/08* (2006.01)

(56) References Cited

U.S. PATENT DOCUMENTS

| | | | |
|---|---|---|---|
| 4,223,443 | A | 9/1980 | Bachman et al. |
| 4,561,447 | A | 12/1985 | Kawamura et al. |
| 5,086,785 | A | 2/1992 | Gentile et al. |
| 5,157,372 | A | 10/1992 | Langford |
| 6,329,897 | B1 | 12/2001 | Osmer et al. |
| 9,952,107 | B2 * | 4/2018 | Blumenkranz .......... G01L 1/246 |
| 2002/0043112 | A1 | 4/2002 | Schwarz et al. |
| 2010/0134782 | A1 * | 6/2010 | Roberts ................. E21B 17/015 356/32 |
| 2011/0057873 | A1 * | 3/2011 | Geissler ................ G06F 1/1626 345/156 |
| 2011/0190666 | A1 * | 8/2011 | Friedland ............... A61B 13/00 600/590 |
| 2014/0224018 | A1 * | 8/2014 | Whitesides .......... G01P 15/0802 73/514.33 |
| 2014/0296734 | A1 | 10/2014 | Tu et al. |

FOREIGN PATENT DOCUMENTS

| | | |
|---|---|---|
| CN | 103353275 | 10/2013 |
| CN | 203518908 U | 4/2014 |
| EP | 0323019 | 7/1989 |
| GB | 2456831 | 7/2009 |

OTHER PUBLICATIONS

International Preliminary Report on Patentability for International Application No. PCT/GB2015/053659, dated Jun. 6, 2017.
Flex Sensor Datasheet (https://www.sparkfun.com/datasheets/sensors/flex/flexsensor.pdf).
Flexion Summary, SensorWiki.org, http://sensorwiki.org/doku.php/sensors/flexion (Nov. 15, 2011).
Basic Sensor Interfacing Techniques, Sensorwiki.org, http://sensorwiki.org/doku.php/tutorials/basic_sensor_interfacing_techniques (Nov. 30, 2010).
Flex Sensor FS Datasheet.
EP Examination Report for Application No. 15 807 976.4 dated Mar. 14, 2018.
Search Report from Chinese Application No. 201580065873.3, dated Dec. 26, 2018.

* cited by examiner

ANGULAR DISPLACEMENT OF FLEXIBLE PIPE

The present invention relates to apparatus and a method for determining a bending radius of a flexible target structure. In particular, but not exclusively, the present invention relates to the location of a housing holding a flexible bend sensor at a predetermined location on or in a flexible pipe or bend stiffener. As a substrate of the sensor bends within the housing an electrical resistance or other such characteristic of a bend sensitive element of the sensor indicates a bend radius associated with the flexible pipe at the position where the sensor is located.

Traditionally flexible pipe is utilised to transport production fluids, such as oil and/or gas and/or water, from one location to another. Flexible pipe is particularly useful in connecting a sub-sea location (which may be deep underwater, say 1000 metres or more) to a sea level location. The pipe may have an internal diameter of typically up to around 0.6 metres (e.g. diameters may range from 0.05 m up to 0.6 m). Flexible pipe is generally formed as an assembly of flexible pipe body and one or more end fittings. The pipe body is typically formed as a combination of layered materials that form a pressure-containing conduit. The pipe structure allows large deflections without causing bending stresses that impair the pipe's functionality over its lifetime. There are different types of flexible pipe such as unbonded flexible pipe which is manufactured in accordance with API 17J or composite type flexible pipe or the like. The pipe body is generally built up as a combined structure including polymer layers and/or composite layers and/or metallic layers. For example, pipe body may include polymer and metal layers, or polymer and composite layers, or polymer, metal and composite layers. Depending upon the layers of the flexible pipe used and the type of flexible pipe some of the pipe layers may be bonded together or remain unbonded.

Some flexible pipe has been used for deep water (less than 3,300 feet (1,005.84 metres)) and ultra-deep water (greater than 3,300 feet) developments. It is the increasing demand for oil which is causing exploration to occur at greater and greater depths (for example in excess of 8202 feet (2500 metres)) where environmental factors are more extreme. For example in such deep and ultra-deep water environments ocean floor temperature increases the risk of production fluids cooling to a temperature that may lead to pipe blockage. In practice flexible pipe conventionally is designed to perform at operating temperatures of −30° C. to +130° C. Increased depths also increase the pressure associated with the environment in which the flexible pipe must operate. For example, a flexible pipe may be required to operate with external pressures ranging from 0.1 MPa to 30 MPa acting on the pipe. Equally, transporting oil, gas or water may well give rise to high pressures acting on the flexible pipe from within, for example with internal pressures ranging from zero to 140 MPa from bore fluid acting on the pipe. As a result the need for high levels of performance from the pressure armour and tensile armour layers of the flexible pipe body is increased. It is noted for the sake of completeness that flexible pipe may also be used for shallow water applications (for example less than around 500 metres depth) or even for shore (overland) applications.

One way to improve the load response and thus performance of armour layers is to manufacture the layers from thicker and stronger and thus more robust materials. For example for pressure armour layers in which the layers are often formed from wound wires with adjacent windings in the layer interlocking, manufacturing the wires from thicker material results in the strength increasing appropriately. However, as more material is used the weight of the flexible pipe increases. Ultimately the weight of the flexible pipe can become a limiting factor in using flexible pipe. Additionally manufacturing flexible pipe using thicker and thicker material increases material costs appreciably, which is also a disadvantage.

It is known that during installation or in use flexible pipe, whatever the type, can experience bending caused by motion at least one end of the flexible pipe. For example as a floating production, storage and offloading (FPSO) vessel heaves or sways on a sea's surface a riser formed by the flexible pipe must bend to accommodate that motion. It is important to ensure that in use such bending does not cause the flexible pipe to bend beyond the point where the bend radius is smaller than a minimum bend radius allocated in the design of that flexible pipe. For that reason it is desirable to be able to monitor an angular displacement at one or more regions of the flexible pipe. Conventional techniques for measuring such bending have focussed upon the measurement of a cord and height from the cord. Such measurement techniques are prone to large error and can prove hard to install on a flexible pipe. They also are limited in terms of their sensitivity and their ability to provide "real time" data as a flexible pipe is installed or put to use.

It is an aim of the present invention to at least partly mitigate the above-mentioned problems.

It is an aim of certain embodiments of the present invention to provide a method and apparatus for determining a bending radius of a structure such as a flexible pipe or cable or the like.

It is an aim of certain embodiments of the present invention to provide a flexible pipe, or bend stiffener that surrounds a flexible pipe, that carries one or more bend sensors in a housing that moves with the bend stiffener or flexible pipe.

It is an aim of certain embodiments of the present invention to provide an apparatus and method which can determine angular displacement of a region of a flexible pipe in real time as a flexible pipe is installed or during service.

It is an aim of certain embodiments of the present invention to provide a method and apparatus for monitoring a bend radius whereby sensors can transmit their data via either a wired or wireless connection to a remote or local monitoring station.

According to a first aspect of the present invention there is provided apparatus for determining a bending radius of a flexible pipe, comprising:
  at least one bend sensor element comprising an elongate flexible substrate and at least one bend sensitive element on the substrate that has at least one electrical characteristic that is responsive to angular displacement of the substrate; and
  a flexible crush resistant elongate housing that supports and surrounds the bend sensor element to allow a relative motion between the housing and the bend sensor element.

Aptly the housing comprises an elongate cavity that extends along a longitudinal axis associated with the housing and in which the substrate of each sensor element is located.

Aptly at least a first end of the substrate of each sensor element in the housing is a free end that is slideable with respect to the surrounding housing.

Aptly a remaining end of each substrate is also a free end.

Aptly the apparatus further comprises at least one locating element in the housing that locates a respective substrate in the housing and urges the substrate into a bent configuration when the housing bends but which allows sliding motion of the substrate with respect to the housing.

Aptly the at least one locating element comprises a plurality of biasing pins provided between an upper and/or lower surface of the substrate and the housing.

Aptly each biasing pin is a foam plug.

Aptly the at least one locating element comprises at least one U-shaped element provided between a respective edge of the substrate and the housing.

Aptly the at least one U-shaped element comprises two elongate U-shaped foam strips each providing a guide channel in which a respective edge of a substrate is locatable.

Aptly the substrate is at least partially slideable in a cavity in the housing.

Aptly the cavity comprises an elongate channel having a substantially constant rectangular cross-section that extends along a portion of the housing.

Aptly the housing is flexible and crush resistant having dimensions that remain substantially fixed up to a crush load limit of about around 30 MPa.

Aptly the housing is an elongate metallic box-like member.

Aptly the housing is air-tight.

Aptly the bend sensitive element comprises a track of a conductive ink on a first surface of the substrate; and
  a first and further electrical connector are disposed on the substrate, each connected to a respective end of the track.

Aptly the apparatus further comprises a further conductive material deposited over at least one portion of the conductive ink track.

Aptly the at least one portion comprises a plurality of spaced apart regions of the conductive ink track.

Aptly the conductive track comprises a region of a binder material and conductive particles printed or deposited on the substrate.

Aptly the conductive ink comprises a mixture of a first ink type and at least one further ink type.

Aptly the bend sensitive element comprises a conductive elastomeric body on a first surface of the substrate; and
  a first and further electrical connector are disposed on the substrate, each connected to a respective end of the elastomeric body.

Aptly an upper surface of the elastomeric body distal to the first surface of the substrate comprises a plurality of spaced apart slits.

Aptly the substrate is a Mylar substrate or a Captan substrate or a carbon fibre substrate.

Aptly the housing supports the substrate and electrical connectors of the sensor element that extend therefrom for providing a bend signal that indicates an angular displacement of the substrate.

Aptly each housing and respective supported sensor element is secured at a predetermined region of an outer surface of a flexible pipe or a bend stiffener located over a flexible pipe.

Aptly each housing and respective supported sensor element is located in a flexible pipe or in a bend stiffener.

According to a second aspect of the present invention there is provided a method for monitoring bending of a flexible pipe, comprising the steps of:
  as a flexible pipe bends, bending at least one flexible crush resistant housing that supports and surrounds an elongate flexible substrate of at least one bend sensor element and allowing a relative motion between the housing and the bend sensor element;
  varying an electrical characteristic provided by a bend sensitive element on the substrate as the substrate bends with the housing; and
  determining a bend radius associated with a region of the flexible pipe where the housing is located responsive to the electrical characteristic.

Aptly the method further comprises determining the bend radius in real time as the flexible pipe bends.

Aptly the method further comprises maintaining an orientation of the bend sensor element with respect to the flexible pipe at a desired orientation via the housing.

Aptly the method further comprises bending the substrate in the housing without applying any substantive tensile or compressive loads on the substrate.

Aptly the method further comprises communicating a bend signal indicative of an angular displacement of the substrate and thus of the flexible pipe, via a wired connection to a top side region of the flexible pipe.

Aptly the method further comprises communicating a bend signal indicative of an angular displacement of the substrate and thus of the flexible pipe, via a wireless connection to a top side region of the flexible pipe.

Aptly the method further comprises triggering monitoring of the bending manually or automatically.

Aptly triggering automatically when a predetermined event occurs or at a predetermined time.

According to a third aspect of the present invention there is provided apparatus constructed and arranged substantially as hereinbefore described with reference to the accompanying drawings.

According to a fourth aspect of the present invention there is provided a method substantially as hereinbefore described with reference to the accompanying drawings.

Certain embodiments of the present invention provide apparatus and a method for determining a bending radius of a flexible pipe or other such target structure.

Certain embodiments of the present invention provide an angular displacement sensor system which is very sensitive and can identify changes in very large radii.

Certain embodiments of the present invention provide a method and apparatus which enables radius measurement to be a direct value derived from the shape of a flexible pipe surface or layer.

Certain embodiments of the present invention provide a method and apparatus for monitoring a bending radius which ensures that orientation of a bend sensor is constantly maintained in a predetermined and desired orientation with respect to the structure being monitored.

Certain embodiments of the present invention provide a method and apparatus which transfers pure bending of a structure being monitored to one or more bend sensors without subjecting the bend sensor to significant tensile or compressive strain loads.

Embodiments of the present invention will now be described hereinafter, by way of example only, with reference to the accompanying drawings in which.

Figure 3:
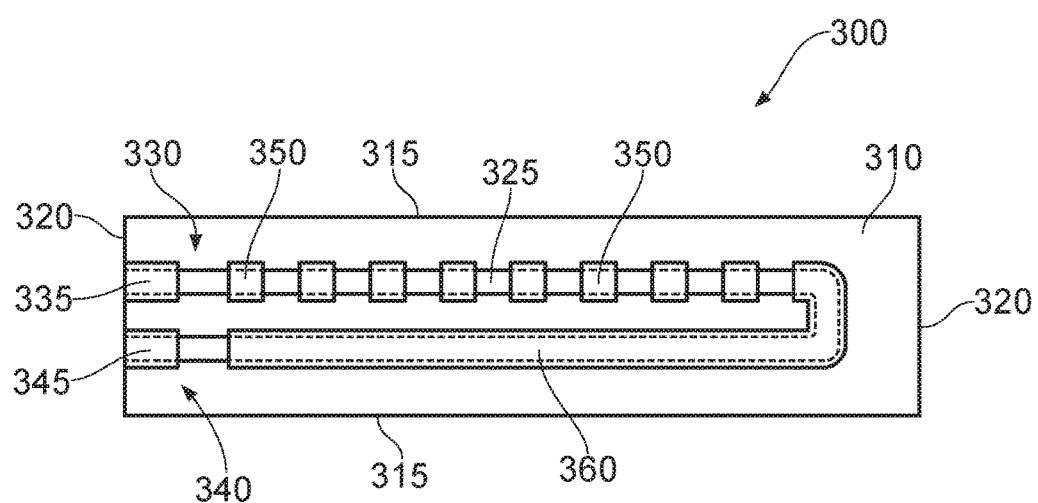
Figure 4:
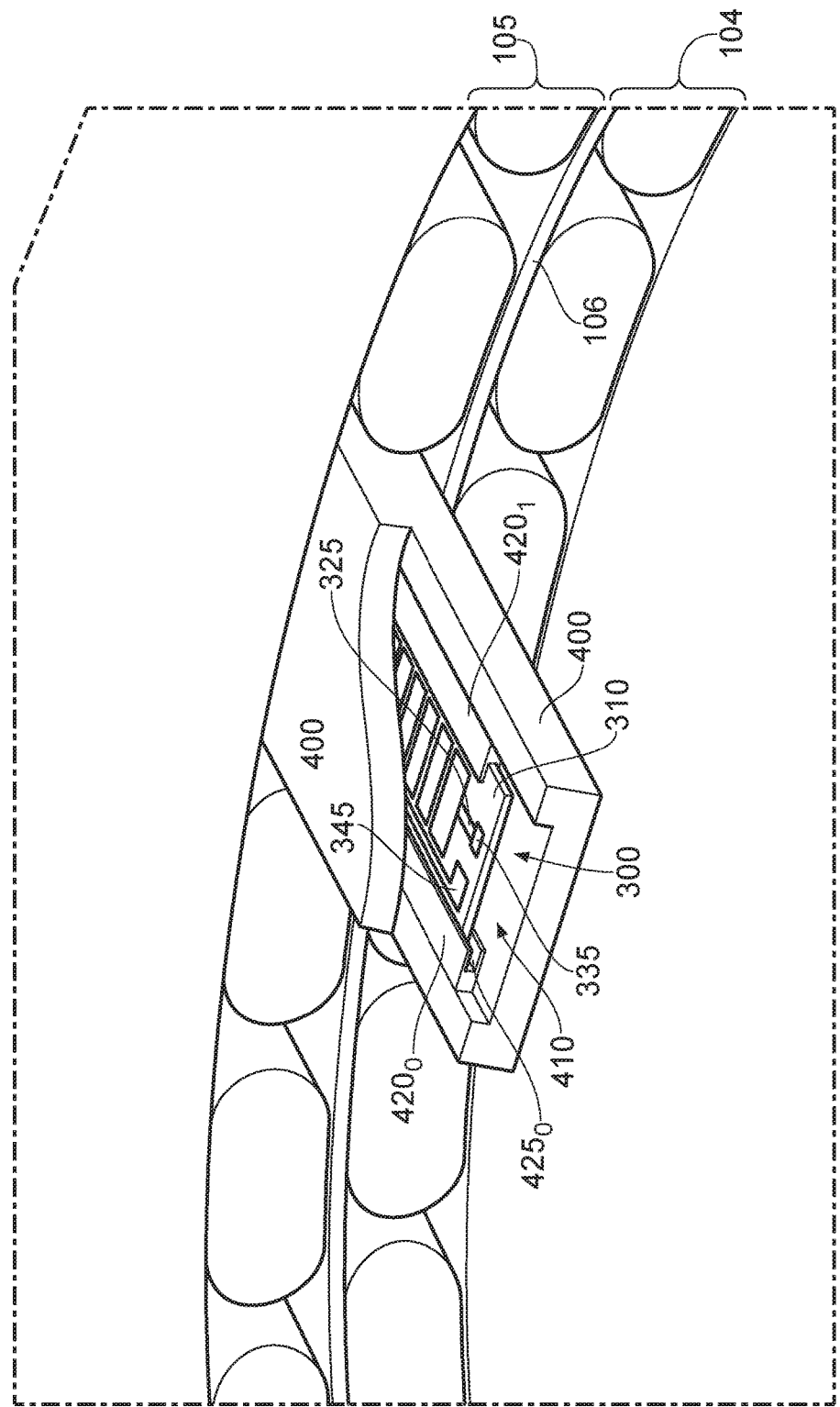
Figure 5:
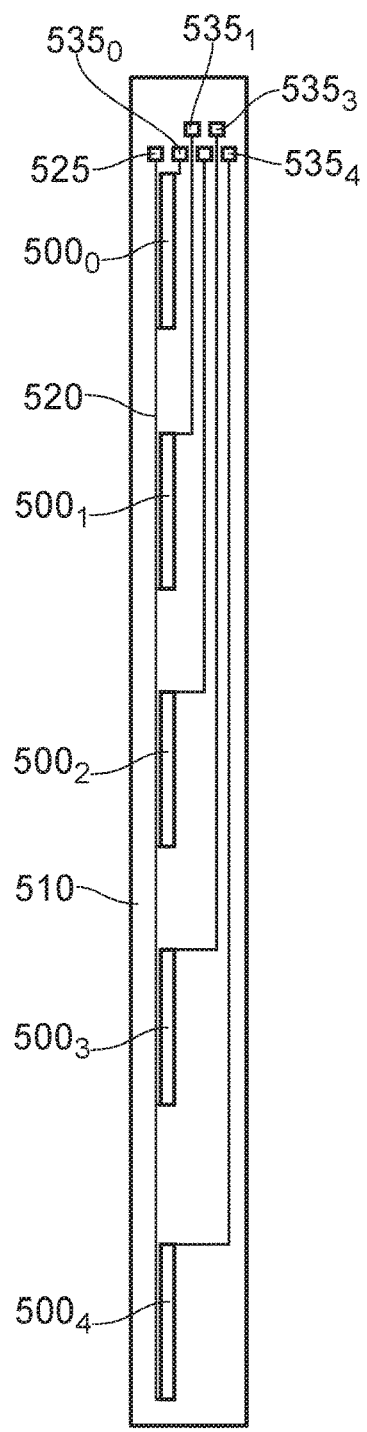
Figure 6A:
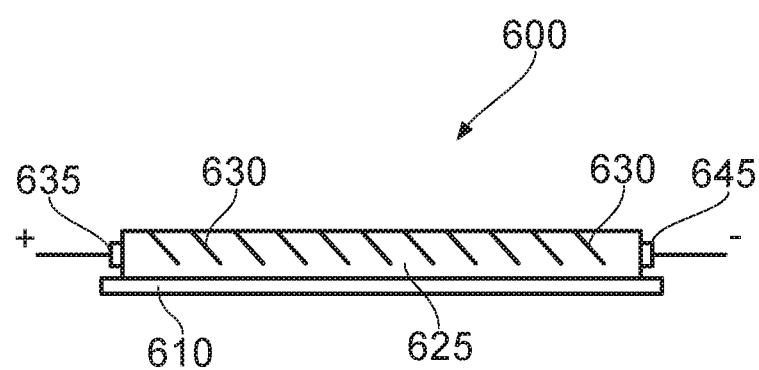
Figure 6B:
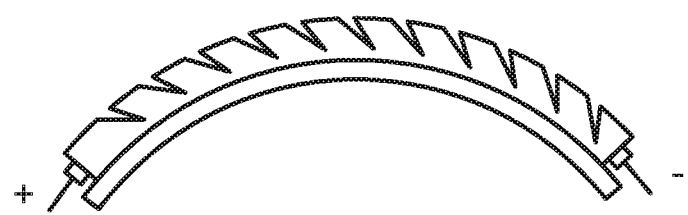
Figure 7:
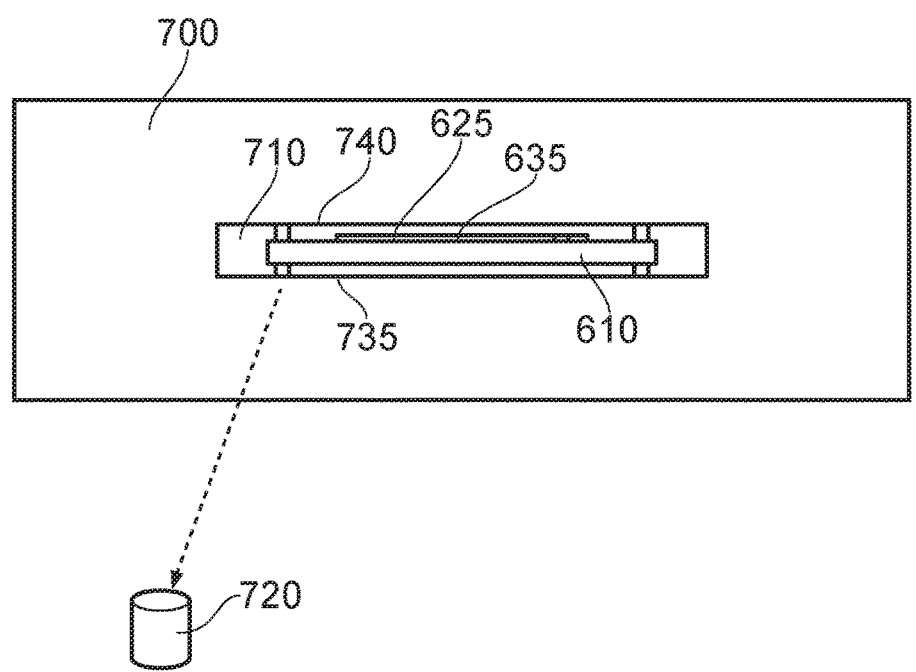
Figure 8:
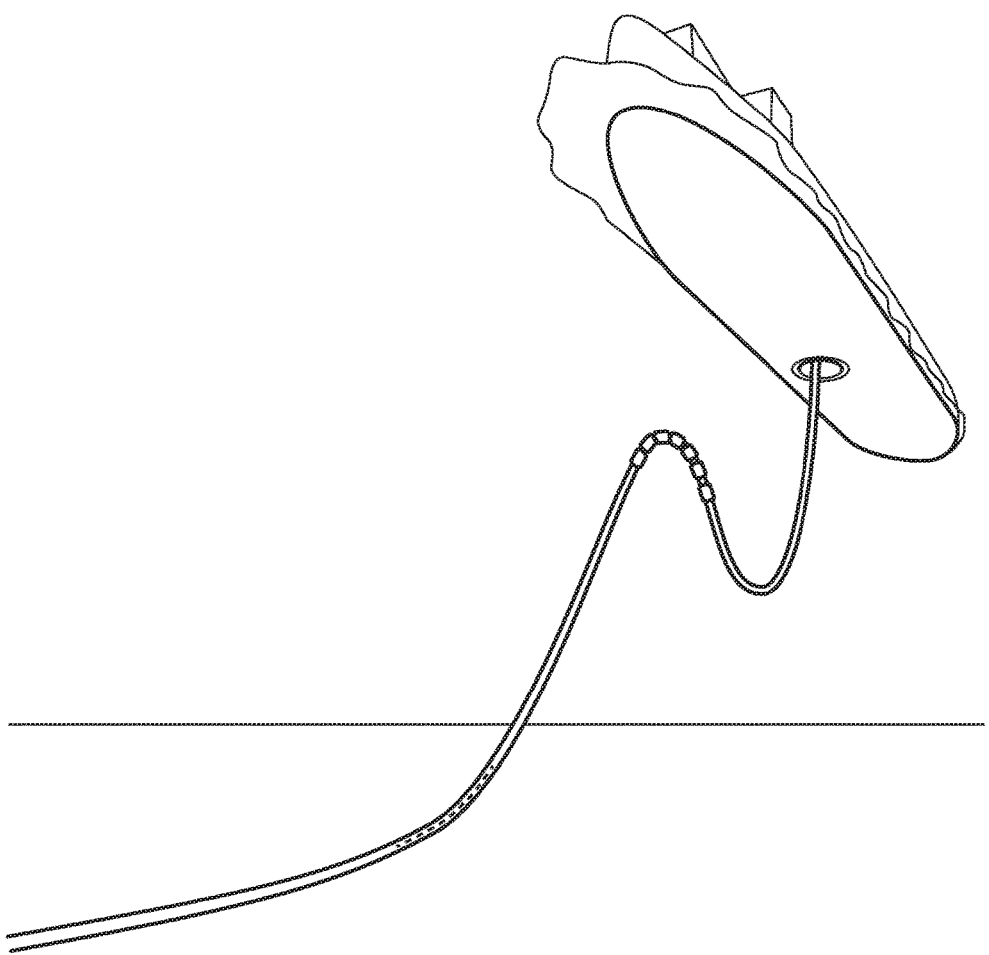

FIG. 3 helps illustrate a bend sensitive element on a substrate;

FIG. 4 helps illustrate a bend sensor element in a flexible pipe;

FIG. 5 helps illustrate a series of elements on a common substrate;

FIG. 6 illustrates an alternative bend sensor;

FIG. 7 helps illustrate the bend sensor of FIG. 6 in a housing;

FIG. 8 illustrates rows of bend sensors on a riser; and

FIG. 9 illustrates bend sensors on a bend stiffener.

In the drawings like reference numerals refer to like parts.

Throughout this description, reference will be made to a flexible pipe. It is to be appreciated that certain embodiments of the present invention are applicable to use with a wide variety of flexible pipe. For example, and as described in more detail below, certain embodiments of the present invention can be used with respect to auxiliary equipment and flexible pipe of the type which is manufactured according to API 17J. Such flexible pipe is often referred to as unbonded flexible pipe. Likewise certain other embodiments of the present invention are usable with flexible pipe and auxiliary equipment like bend stiffeners for flexible pipe of a composite type structure. Such composite type flexible pipe and its manufacture is currently being standardised by the API. It is also noted for the avoidance of doubt that certain other embodiments of the present invention are applicable to a method and apparatus for determining a bend radius of a flexible structure. The target structure may be a flexible pipe but according to certain other embodiments of the present invention the target structure may be a cable or other such elongate flexible construction element.

Figure 1:
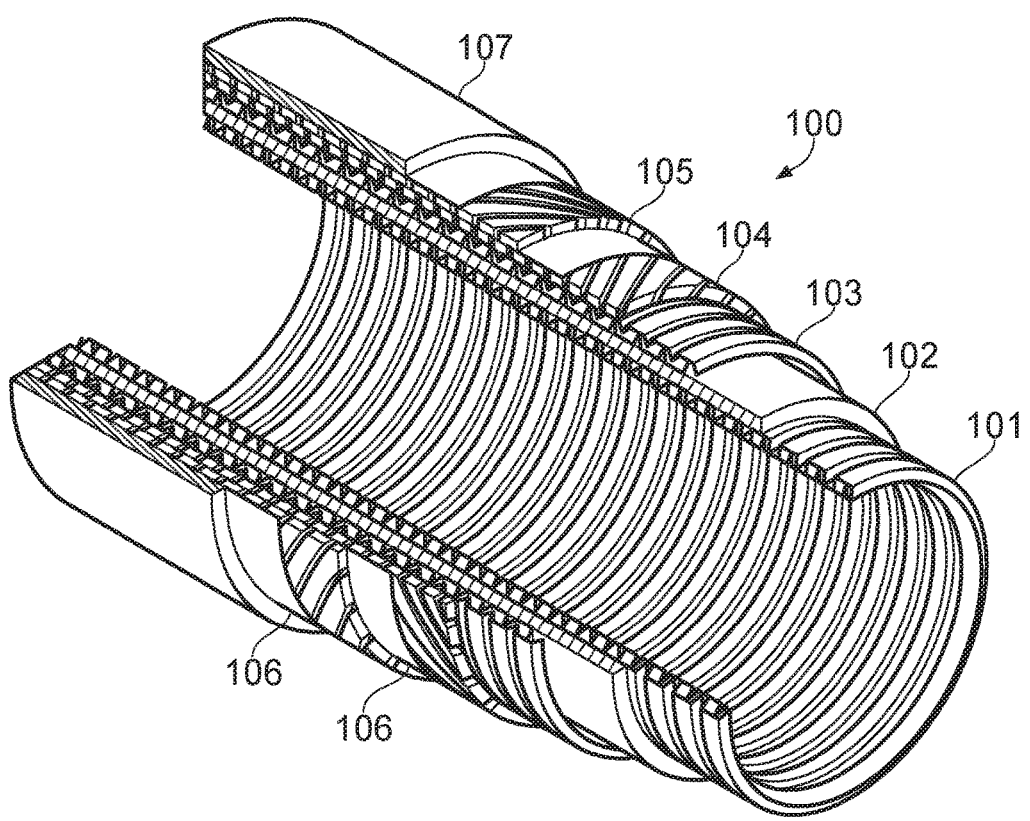
FIG. 1 illustrates flexible pipe body.

Turning to FIG. 1 it will be understood that the illustrated flexible pipe is an assembly of a portion of pipe body and one or more end fittings in each of which a respective end of the pipe body is terminated. FIG. 1 illustrates how pipe body 100 is formed from a combination of layered materials that form a pressure-containing conduit. As noted above although a number of particular layers are illustrated in FIG. 1, it is to be understood that certain embodiments of the present invention are broadly applicable to coaxial pipe body structures including two or more layers manufactured from a variety of possible materials. It is to be further noted that the layer thicknesses are shown for illustrative purposes only. As used herein, the term "composite" is used to broadly refer to a material that is formed from two or more different materials, for example a material formed from a matrix material and reinforcement fibres.

The pipe body illustrated in FIG. 1 includes an innermost carcass layer 101. The carcass is a pressure resistant layer that provides an interlocked construction that can be used as the innermost layer to prevent, totally or partially, collapse of an internal pressure sheath 102 due to pipe decompression, external pressure, and tensile armour pressure and mechanical crushing loads. The carcass is a crush resistant layer. It will be appreciated that certain embodiments of the present invention are thus applicable to 'rough bore' applications (with a carcass). Aptly the carcass layer is a metallic layer. Aptly the carcass layer is formed from stainless steel, corrosion resistant nickel alloy or the like. Aptly the carcass layer is formed from a composite, polymer, or other material, or a combination of materials.

The internal pressure sheath 102 acts as a fluid retaining layer and comprises a polymer layer that ensures internal fluid integrity. The layer provides a boundary for any conveyed fluid. It is to be understood that this layer may itself comprise a number of sub-layers. It will be appreciated that when the carcass layer is utilised the internal pressure sheath is often referred to by those skilled in the art as a barrier layer. In operation without such a carcass (so-called smooth bore operation) the internal pressure sheath may be referred to as a liner.

A pressure armour layer 103 is a pressure resistant layer that provides a structural layer that increases the resistance of the flexible pipe to internal and external pressure and mechanical crushing loads. The layer also structurally supports the internal pressure sheath, and typically consists of an interlocked construction of wires with a lay angle close to 90°. Aptly the pressure armour layer is a metallic layer. Aptly the pressure armour layer is formed from carbon steel, aluminium alloy or the like. Aptly the pressure armour layer is formed from a composite, polymer, or other material, or a combination of materials.

The flexible pipe body also includes an optional first tensile armour layer 104 and optional second tensile armour layer 105. Each tensile armour layer is used to sustain tensile loads and internal pressure. The tensile armour layer is often formed from a plurality of metallic wires (to impart strength to the layer) that are located over an inner layer and are helically wound along the length of the pipe at a lay angle typically between about 10° to 55°. The tensile armour layers are often counter-wound in pairs. Aptly the tensile armour layers are metallic layers. Aptly the tensile armour layers are formed from carbon steel, aluminium alloy or the like. Aptly the tensile armour layers are formed from a composite, polymer, or other material, or a combination of materials.

The flexible pipe body shown also includes optional layers of tape 106 which help contain underlying layers and to some extent prevent abrasion between adjacent layers. The tape layer may optionally be a polymer or composite or a combination of materials. Tape layers can be used to help prevent metal-to-metal contact to help prevent wear. Tape layers over tensile armours can also help prevent "birdcaging".

The flexible pipe body also includes optional layers of insulation and an outer sheath 107, which comprises a polymer layer used to protect the pipe against penetration of seawater and other external environments, corrosion, abrasion and mechanical damage. Any thermal insulation layer helps limit heat loss through the pipe wall to the surrounding environment.

Each flexible pipe comprises at least one portion, sometimes referred to as a segment or section of pipe body 100 together with an end fitting located at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
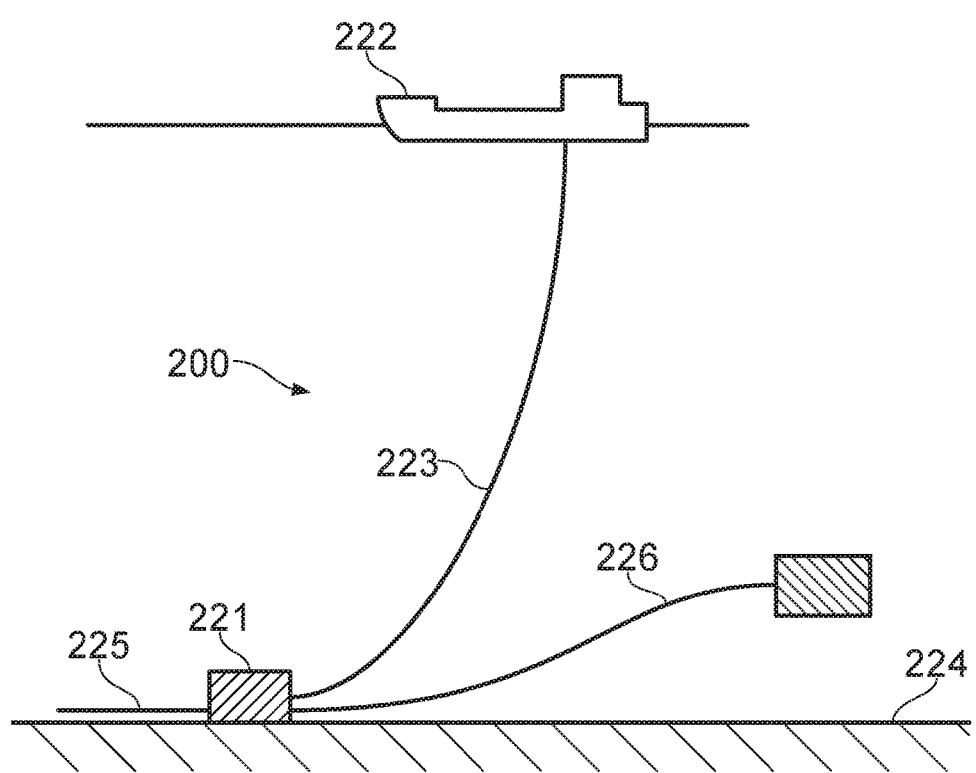
FIG. 2 illustrates flexible pipes.

FIG. 2 illustrates a riser assembly 200 suitable for transporting production fluid such as oil and/or gas and/or water from a sub-sea location 221 to a floating facility 222. For example, in FIG. 2 the sub-sea location 221 includes a sub-sea flow line. The flexible flow line 225 comprises a flexible pipe, wholly or in part, resting on the sea floor 224 or buried below the sea floor and used in a static application. The floating facility may be provided by a platform and/or buoy or, as illustrated in FIG. 2, a ship. The riser assembly 200 is provided as a flexible riser, that is to say a flexible pipe 223 connecting the ship to the sea floor installation. The flexible pipe may be in segments of flexible pipe body with connecting end fittings.

It will be appreciated that there are different types of riser, as is well-known by those skilled in the art. Certain embodiments of the present invention may be used with any type of riser, such as a freely suspended (free, catenary riser), a riser restrained to some extent (buoys, chains), totally restrained riser or enclosed in a tube (I or J tubes). FIG. 2 also illustrates how portions of flexible pipe can be utilised as a jumper 226.

FIG. 3 illustrates a bend sensor 300 which includes an elongate flexible substrate 310 which is substantially rectangular in shape having two spaced apart "long" side edges 315 and two spaced apart "end" edges 320. Other shapes of substrate could of course be utilised. The sensor 300 is an angular displacement sensor which can be used to measure a change in distance which occurs on an outside of a bent target structure. The sensor 300 illustrated in FIG. 3 is a conductive ink type sensor which utilises a track of conductive ink 325 printed or deposited on the substrate 310. For example the substrate illustrated in FIG. 3 is a carbon fibre substrate. Aptly as an alternative Mylar or Captan or the like could be used as a substrate material. The conductive ink comprises carbon particles in a binder. When the substrate is bent such that the printed ink is on an outside of a bend, two physical reactions within the ink cause a change in its electrical resistance. In the first physical reaction the ink stretches causing a distance between conductive carbon particles to increase. This causes a very steady predictable increase in electrical resistivity. This physical reaction also has an effect when the conductive ink is on the inside of a bend. In such circumstances the distances between particles in the ink decrease thus decreasing resistivity. By a second physical reaction micro cracks form transversely to the longitudinal extent of the sensor when the conductive ink is on the outside of the bend. As the bend increases the width of these cracks increases causing a more dramatic increase in electrical resistance.

Aptly two ink formulas may be mixed to create the conductive ink utilised in the bend sensor 300. The formulas and mixture may be selected depending upon the particular circumstances and characteristics to be measured/determined. A durable stretchable ink formula embodies the characteristics of the first physical reaction and a second ink formula which is more brittle and embodies the characteristics of the second physical reaction can be used. These two inks may be mixed as will be appreciated by those skilled in the art to select performance of the bend sensor. A suitable ink comprising a combination of both ink types can be obtained from Amtec International lot 92349.

As illustrated for the sensor 300 shown in FIG. 3 the conductive ink is provided in a deposited fashion in a respective substantially U-shaped layout. A first end 330 of the conductive track 325 ends in a terminal 335. A remaining end 340 of the U-shape track ends in a further electrical terminal 345. Aptly each terminal is a contact pad. Because the resistance of such inks is typically high (for example in the mega ohm range) the sensor resistance range may be translated into a lower range by depositing regions of a highly conductive material, such as a metallic material, over the conductive ink in selected areas 350. For example eight spaced apart pads of copper are illustrated deposited over the track 325 in FIG. 3. Each pad 350 in effect creates a series of individual conductive ink sensors whose combined resistance is less than a sensor not containing the metallic deposits. In the sensor illustrated in FIG. 3 a large track 360 of a metal such as copper or gold or the like is deposited over a return leg of the conductive ink track. It will be appreciated that according to certain embodiments of the present invention the conductive ink track can be a linear straight track with conductive tracks being deposited on the substrate to connect and provide the contact terminals 335, 345 at any desired location along a length of the substrate. Other shapes and configurations could of course be utilised. The conductive ink track 325 is a bend sensitive element on the substrate 310. The resistivity (or indeed various other electrical characteristics) of the bend sensitive element varies in response to angular displacement of the substrate. That is to say as the substrate is bent at least one electrical characteristic associated with the bend sensitive element varies in response to the angular displacement of the substrate.

FIG. 4 illustrates a sensor like that illustrated in FIG. 3 in a flexible housing 400. The flexible housing is crush resistant and has dimensions that remain substantially fixed up to a crush load limit of about around 30 MPa. Aptly the crush load limit is more than 20 MPa. Aptly the housing is a hollow carbon fibre element. As illustrated in FIG. 4 the housing 400 includes a central cavity 410 provided by spaced apart upper and lower surfaces and edges of the housing 400. The housing thus provides an elongate cavity that extends along a longitudinal axis associated with the housing and in which the substrate 310 of the sensor is located. The substrate 310 is supported in the cavity 410 by two opposed foam guides $420_{0,1}$. Each foam guide has a substantially U-shaped cross section to provide a respective channel $425_{0,1}$ in which a long side edge 315 of the substrate 310 can be located. Each foam guide 420 thus acts as a locating element in the housing to locate a respective substrate in the housing and to help urge the substrate into a bent configuration when the housing 400 bends. The locating elements do allow some sliding motion of the substrate with respect to the housing so that when the housing is deformed (caused by the flexible pipe bending) the substrate is free to adopt a bent configuration substantially matching the bend radius of the housing 400. The substrate thus effectively floats within the cavity. This disconnects the substrate and supported bend sensitive element from forces which might cause the sensor to fail whilst still enabling the sensor to adopt a curve corresponding to that of the housing.

As illustrated in FIG. 4 the housing 400 can be provided in a flexible pipe by winding the housing as a replacement for a tensile wire winding.

The end terminals 335, 345 are connected to connecting traces which extend along the length of the housing (not shown) by flexible fine wires which permit the substrate to move slightly with respect to the housing without breaking connection. Other flexible connectors such as flexible PCB strips could of course be utilised. An electrical characteristic associated with the sensor (wherever it is located along a length of the flexible pipe body) can thus be determined in real time as the flexible pipe body bends. From this a bend radius of the flexible pipe where the sensor is located can be determined.

The sensor illustrated in FIG. 4 makes use of a housing provided in the flexible pipe body with the bend sensor located at only one location along the length of the flexible pipe body. This is because if the bend sensor itself were made to extend a substantially long distance along the target different bent structure regions of the flexible pipe body would effectively cause a cancelling out a varying electrical characteristic. As a result it would be difficult if not impossible to determine bending at various locations along the flexible pipe. FIG. 5 illustrates a further solution to this problem. The resilient nature of the foam locating guides helps accommodate some relative motion between the housing and substrate which would otherwise create potentially destructive forces on the sensor parts.

FIG. 5 illustrates an alternative embodiment of the present invention in which a common substrate 510 can support multiple sensors (five shown in FIG. 4) in a spaced apart serial configuration. Each sensor $500_{0-4}$ is arranged in an end-to-end spaced apart configuration with respect to the other sensors and is provided on a common substrate 510. A common earth track 520 leads to a corresponding terminal 525 whilst remaining contact pads $535_{0-4}$ provide terminals connected via respective electrically conductive tracks to a respective end of a respective sensor 500. Each sensor 500 is of a type similar to that illustrated in FIG. 3 but not formed as a U-shape conductive ink track but rather as a single elongate straight track with contact terminals at either end. U-shaped sensors could of course be used but would require a corresponding connection network of traces on the substrate and/or housing.

Having multiple sensors each arranged at respective locations along a common substrate allows bending at different points along a target structure such as a flexible pipe to be independently monitored. That is to say as the flexible pipe bends a bend radius associated with the substrate at the bent region of the flexible pipe can be determined. By having a common substrate which can have a significant length sensors can be conveniently provided at a plurality of locations where a bend radius is to be determined. By determining a bend radius in real time the outputs from each sensor can be continually monitored and used to inform a monitoring system which can analyse pipe movement over a predetermined period of time.

An electrical voltage can be applied to the sensor and a change in current which will be proportional to the change in resistance may be measured to determine an amount of bending. Alternatively the sensor can be mounted in a voltage divider arrangement and a change in voltage across the sensor with bending can be measured. The voltage across the sensor varying according to the degree of stretch induced by the amount of bending.

FIG. 6a illustrates an alternative sensor 600 for measuring angular displacement based on bending of a substrate 610. The sensor 600 utilises a conductive elastomer. That is to say makes use of a rubber-like material with elastic properties manufactured with compounds which enable it to conduct electricity. Aptly the elastomer 625 is a carbon impregnated flexible rubber. Aptly carbon is impregnated into silicone or plastic or the like. The conductivity/resistivity or conductance/resistance of the elastomer material is variable responsive to its dimensions. Aptly the resistance is proportional to the length and cross sectional area of the conductive elastomer 625. Altering the length of the material with a constant cross sectional area will change its conductivity such that the shorter the material the greater its conductivity. Likewise if a cross sectional area is altered whilst a length remains constant a change in conductivity will take place such that the greater cross sectional area of the material the greater its conductivity. When the conductive elastomer is stretched its length increases and its cross sectional area decreases. As a result conductive characteristics associated with the conductive elastomer change. As a conductive elastomer strip is stretched its resistivity will rise. The conductive elastomer 625 illustrated in FIG. 6a is mounted on the substrate 610. Both ends of the conductive elastomer material are mounted permanently. Aptly the conductive elastomer is cemented along its interface with the substrate to the substrate. As a bend takes place (illustrated in FIG. 6b) there is no slippage at either end and stretching of the conductive elastomer material occurs along the length of the bend sensitive element as the substrate bends. The conductive elastomer sensor illustrated in FIGS. 6a and 6b illustrate a diced conductive elastomer sensor which incorporate diagonal slices 630. The slices widen (shown in FIG. 6b) as the degree of bend increases causing a corresponding increase in electrical resistance. As the sensor is straightened the slice is closed and the electrical resistance decreases. This design helps minimise a memory effect or hysteresis of the conductive elastomer. It will be appreciated that certain embodiments of the present invention can utilise conductive elastomer sensors which are not diced or which are diced in other ways.

As illustrated in FIG. 6a a first electrical terminal 635 is connected to a first respective end of the conductive elastomer whilst a further electrical terminal 645 is connected to a remaining end of the conductive elastomer.

An electrical voltage can be applied to the sensor and a change in current which will be proportional to the change in resistance may be measured to determine an amount of bending. Alternatively the sensor can be mounted in a voltage divider arrangement and a change in voltage across the sensor with bending can be measured. The voltage across the sensor varying according to the degree of stretch induced by the amount of bending. As noted above a similar system can be used with respect to the sensor 300 type illustrated in FIG. 3.

FIG. 7 helps illustrate how the sensor 600 illustrated in FIGS. 6a and 6b can be located in a cavity in a housing 700. The housing 700 illustrated in FIG. 7 is shown end on with a central rectangular shaped cavity 710 extending along a length of the housing and the substrate 610 likewise extending along the cavity. The conductive elastomer 625 is illustrated end on cemented on an upper surface of the substrate 610 (again shown end on). Foam plugs 720 are located in a row between a lower surface of the substrate and an opposed inner wall surface 735 of the cavity in the housing as well as between an upper surface of the substrate and a lower wall surface 740 of the cavity. The foam plugs 720 have a resiliency which helps urge the substrate into a bent shape corresponding to the bent shape of the housing wherever the housing is located. Whilst thus causing the substrate to adopt a bent shape whenever needed the plugs are flexible enough to enable some lateral motion in a direction longitudinally along the cavity to accommodate changes in relative position between the substrate and the housing. It will be appreciated that multiple plugs can be duly located along the length of the substrate/cavity. It will likewise be appreciated that according to certain embodiments of the present invention the U-shaped foam guides or other such locating elements illustrated in FIG. 4 could also be utilised with the conductive elastomer type sensor 600.

The contact terminals 635, 645 of the elastomer type sensor are connected to conductive tracks on the substrate and/or housing via a flexible wire or flexible PCB connector or the like. As a result as per the embodiment illustrated previously the substrate is effectively a floating substrate duly located in the cavity of the housing by the resilient locating elements. The floating substrate can thus adopt any curved shape to match a curve shape induced in the housing in use but without risk of destructive forces caused by the mutual movement causing failure of a sensor. It will be appreciated by those skilled in the art that rather than have a wholly floating substrate one end of any substrate can be securely fixed to the housing in a rigid manner with resilient locating elements such as the foam guides or foam plugs being located at other locations along the length of the substrate and at a free end of the substrate.

FIG. 8 helps illustrate how certain embodiments of the present invention can be utilised on a flexible riser connecting a subsea location to an FPSO 222. As illustrated in FIG. 8 five spaced apart sensors (more or less could of course be used) can be duly located near a touch down region of a flexible riser. The sensors can be arranged on a common substrate as per FIG. 5 or alternatively can be provided on respective separate substrates. The sensors and substrates can be wound as a flexible winding as per FIG. 4 or alternatively can be provided between any appropriate layer of the flexible pipe body or indeed on an outer surface of the flexible pipe body. Electrical connections (not shown) are made between the sensors and a surface monitoring unit which can receive signals indicative of a bend radius of a bend sensor in real time. Over time this can be used to monitor bending of the flexible pipe at a desired location.

It will be appreciated that certain embodiments of the present invention can be used to determine a bend radius of a flexible pipe during installation in addition to or as an alternative to measuring the bend radius in use subsequent to installation. It will be appreciated that when a flexible riser is installed at a desired location the flexible riser is often wound off a surface vessel. Under such circumstances it is essential that a bend radius of the flexible pipe does not exceed a predetermined limit which would cause over bending. By providing sensors in accordance with certain embodiments of the present invention along a length of a flexible pipe the installation process as a whole or as a snap shot at any desired moment in time can be monitored to ensure over bending has not occurred which would otherwise potentially lead to failure of the flexible pipe in use.

Figure 9A:
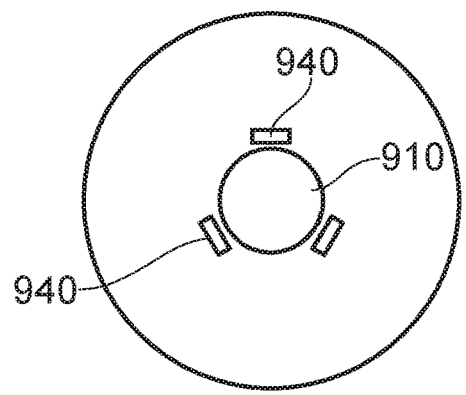
Figure 9B:
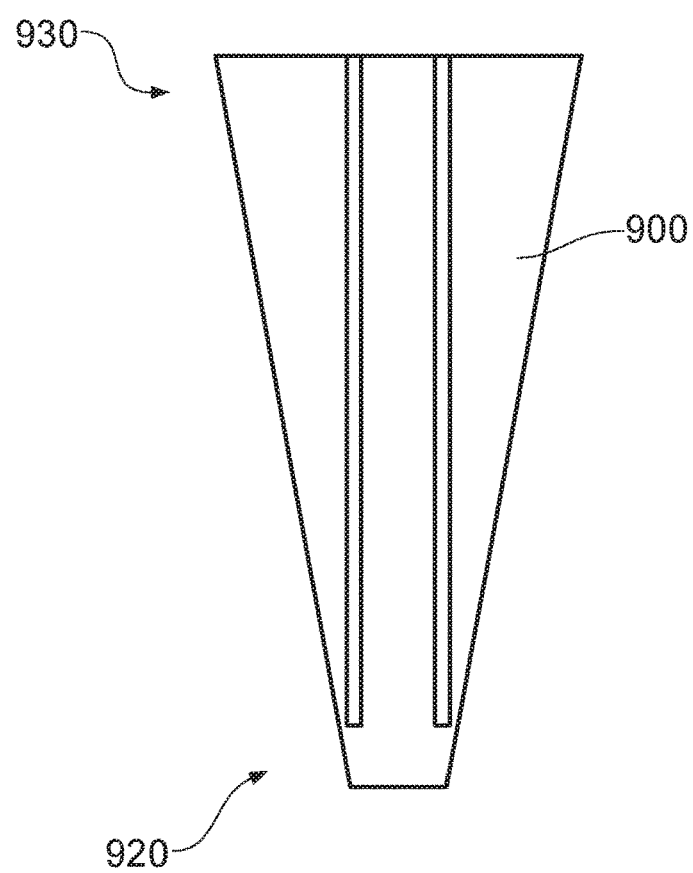

FIG. 9 helps illustrate how certain embodiments of the present invention can be utilised to monitor bending of a bend stiffener 900 of a type used with a flexible pipe. Rather, than a bend stiffener other flexible/bendable auxiliary equipment could of course have their bending sensed. FIG. 9a illustrates an end view of a bend stiffener with a central circular through hole 910 sized to receive an outer sheath of a desired flexible pipe. The bend stiffener 900 has a generally frusto conical configuration having a tapered nose region 920 which flares outwardly to a more rigid wider radius end 930 of the bend stiffener. The bend stiffener includes a plurality of slots 940 (three shown in FIG. 9a) which extend along a length of the bend stiffener (as shown more clearly in FIG. 9b) which shows two of the three slots of FIG. 9a. These slots are sized to receive the flexible crush resistant housing containing sensors of any of the previously described embodiments. Electrical connection is made from ends of the bend stiffener to a monitoring unit to enable bending of the bend stiffener to be selectively monitored over a predetermined period of time.

The monitoring unit for certain embodiments of the present invention may be configured such that it is manually activated or triggered, by other monitoring systems installed on the flexible pipe or ancillary equipment, in response to a detected or recognised event. Such an event may be a severe bending of the riser, gross vessel/platform movements (for instance in a storm) or abnormal operating conditions (e.g. excessive/unexpected operating tension loading in the riser system). Conversely according to certain embodiments of the present invention the above described sensor and monitoring system could be used as the trigger for separate systems to monitor other parameters in the flexible pipe or to activate an alarm system to indicate abnormal status of the flexible pipe.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. Apparatus for determining a bending radius of a flexible pipe for transporting production fluids from one location to another, comprising:
   at least one bend sensor element comprising an elongate flexible substrate and at least one bend sensitive element on the substrate that has at least one electrical characteristic that is responsive to angular displacement of the substrate; and
   a flexible crush resistant elongate housing that supports and surrounds the bend sensor element to allow a relative motion between the housing and the bend sensor element, wherein a cavity is provided in the housing and the substrate is at least partially slideable in the cavity.

2. The apparatus as claimed in claim 1, further comprising:
   the housing comprises an elongate cavity that extends along a longitudinal axis associated with the housing and in which the substrate of each sensor element is located.

3. The apparatus as claimed in claim 1, further comprising:
   at least a first end of the substrate of each sensor element in the housing is a free end that is slideable with respect to the surrounding housing.

4. The apparatus as claimed in claim 3 wherein a remaining end of each substrate is also a free end.

5. The apparatus as claimed in claim 1, further comprising:
   at least one locating element in the housing that locates a respective substrate in the housing and urges the substrate into a bent configuration when the housing bends but which allows sliding motion of the substrate with respect to the housing.

6. The apparatus as claimed in claim 5, further comprising:
   the at least one locating element comprises a plurality of biasing pins provided between an upper and/or lower surface of the substrate and the housing.

7. The apparatus as claimed in claim 6 wherein each biasing pin is a foam plug.

8. The apparatus as claimed in claim 5, further comprising:
the at least one locating element comprises at least one U-shaped element provided between a respective edge of the substrate and the housing.

9. The apparatus as claimed in claim 8 wherein the at least one U-shaped element comprises two elongate U-shaped foam strips each providing a guide channel in which a respective edge of a substrate is locatable.

10. The apparatus as claimed in claim 1, further comprising:
the substrate is at least partially slidable in a cavity in the housing.

11. The apparatus as claimed in claim 1 wherein:
the bend sensitive element comprises a track of a conductive ink on a first surface of the substrate; and
a first and further electrical connector are disposed on the substrate, each connected to a respective end of the track.

12. The apparatus as claimed in claim 11, further comprising:
a further conductive material deposited over at least one portion of the conductive ink track.

13. The apparatus as claimed in claim 12 wherein said at least one portion comprises a plurality of spaced apart regions of the conductive ink track.

14. The apparatus as claimed in claim 11 wherein the conductive track comprises a region of a binder material and conductive particles printed or deposited on the substrate.

15. The apparatus as claimed in claim 11 wherein the conductive ink comprises a mixture of a first ink type and at least one further ink type.

16. The apparatus as claimed in claim 1, further comprising:
each housing and respective supported sensor element is located in a flexible pipe or in a bend stiffener.

17. A method for monitoring bending of a flexible pipe for transporting production fluids from one location to another, comprising the steps of:
as a flexible pipe bends, bending at least one flexible crush resistant housing that supports and surrounds an elongate flexible substrate of at least one bend sensor element and allowing a relative motion between the housing and the bend sensor element that includes at least partial sliding of the substrate in a cavity provided in the housing;
varying an electrical characteristic provided by a bend sensitive element on the substrate as the substrate bends with the housing; and
determining a bend radius associated with a region of the flexible pipe where the housing is located responsive to the electrical characteristic.

18. The method as claimed in claim 17, further comprising:
determining the bend radius in real time as the flexible pipe bends.

\* \* \* \* \*